Oct. 11, 1949.                J. H. WORTHEN                2,484,772
                         TOLERANCE LIMIT INDICATOR
                           Filed Nov. 15, 1944

INVENTOR
John H. Worthen
BY Barlow & Barlow
ATTORNEYS

Patented Oct. 11, 1949

2,484,772

UNITED STATES PATENT OFFICE 2,484,772

TOLERANCE LIMIT INDICATOR

John H. Worthen, Providence, R. I., assignor to Federal Products Corporation, a corporation of Rhode Island Application November 15, 1944, Serial No. 563,468

4 Claims. (Cl. 116—129)

This invention relates to an indicating micrometer.

An object of this invention is to provide a simple and convenient means of reading an indicator between certain tolerances which are allowed for a particular piece of work.

Another object of this invention is to provide a pair of tolerance arms that may be independently moved to either side of the desired size or position that the indicating hand should take.

With these and other objects in view, the invention consists of certain novel features of construction, as will be more fully described and particularly pointed out in the appended claims.

Figure 1:
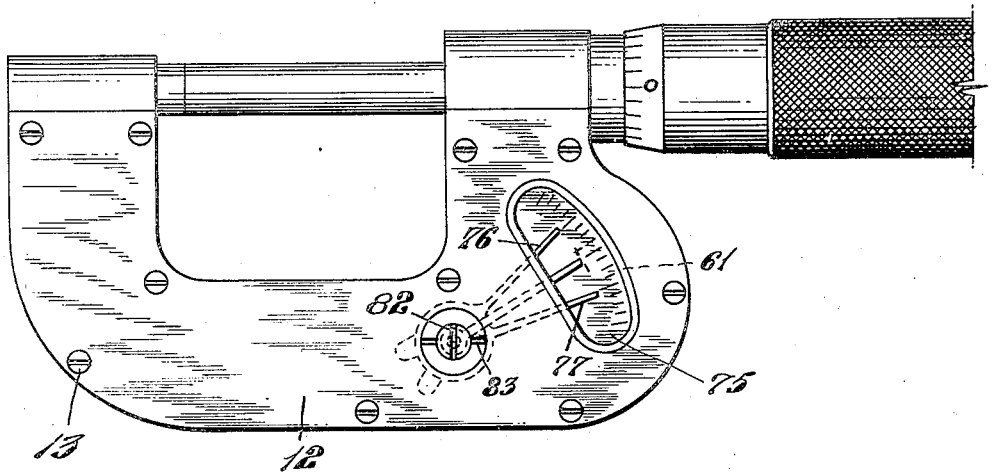
Fig. 1 is a view showing in plan the tolerance arms in detail.
Figure 2:
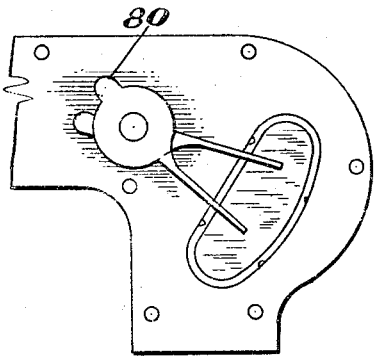
Fig. 2 is a fragmental view of the tolerance arms alone looking at the under side of the plate upon which they are mounted.
Figure 3:
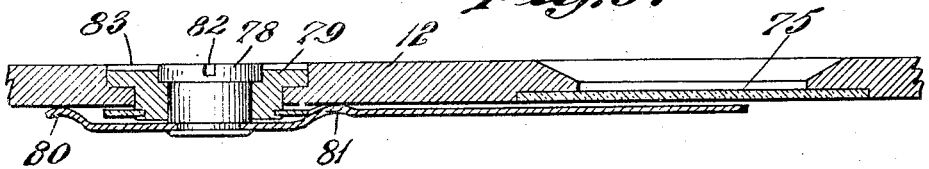
Fig. 3 is a fragmental sectional view on a greatly enlarged scale indicating the mounting of the tolerance arms.

In proceeding with this invention I provide two hubs, one rotatable within the other, one of which carries one arm and the other another arm for indicating either side of the range of movement of an indicating arm on a micrometer or some like instrument.

With reference more particularly to the drawings, I have shown a C-shaped frame of a micrometer in its usual form having a cover member 12 which is held in position by screws 13 at various locations along its marginal edge.

The cover 12 is provided with a window 75 through which the scale 61 may be observed. In order that allowable tolerances may be indicated on the scale I have provided tolerance arms 76 and 77. Concentric hubs 78 and 79 are provided for mounting these arms, arm 76 being mounted on the hub 78 while the arm 77 is mounted on the hub 79. In order to provide a balanced frictional pressure so that one hub and its hand may move independently of the other hub and its hand, each of the arms is deflected as at 80 on one side of their hub mounting and 81 on the other side usually at diametrically opposite locations so as to provide an even balanced arrangement of frictional retardation of each arm against the plate or cover 12 upon which it is mounted. By this arrangement by engaging the slots as 82 in the hub 78, or 83 in the hub 79 each of the arms and its hub may be moved independently through an extent of about 180° if necessary or until the deflected portions on one arm come in contact with the other arm.

I claim:

1. Tolerance arms for an indicator comprising a plate, concentric hubs rotatably mounted therein, an arm mounted to move with the outer hub, and an arm mounted on the inner hub, one of said arms being provided with spaced portions deflected to engage said plate and provide sufficient friction to prevent movement when the other arm is adjusted.

2. Tolerance arms for an indicator comprising a plate, concentric hubs rotatably mounted therein, an arm mounted to move with the outer hub, and an arm mounted on the inner hub, both of said arms being provided with spaced portions deflected to engage said plate and provide sufficient friction to prevent movement of one arm when the other arm is adjusted.

3. Tolerance arms for an indicator comprising a plate, concentric hubs rotatably mounted therein, an arm mounted to move with the outer hub, and an arm mounted on the inner hub, one of said arms being provided with diametrically located portions deflected to engage said plate and provide sufficient friction to prevent movement of one arm when the other arm is adjusted.

4. Tolerance arms for an indicator comprising a plate, concentric hubs rotatably mounted therein, an arm mounted to move with the outer hub, and an arm mounted on the inner hub with equally angularly spaced portions deflected to engage said plate and provide sufficient friction to prevent movement when the other arm is adjusted.

JOHN H. WORTHEN.

REFERENCES CITED

The following references are of record in the file of this patent:

UNITED STATES PATENTS

| Number | Name | Date |
| --- | --- | --- |
| 903,484 | Lane et al. | Nov. 10, 1908 |
| 1,463,321 | Jacobson | July 31, 1923 |
| 1,530,067 | Young | Mar. 17, 1925 |
| 1,561,630 | Wilson | Mar. 17, 1925 |
| 1,639,321 | Wheelock | Aug. 16, 1927 |
| 1,679,224 | Maynard | July 31, 1928 |
| 1,723,390 | Tingley | Aug. 6, 1929 |
| 1,734,183 | Shore | Nov. 5, 1929 |
| 2,388,190 | Loxham | Jan. 4, 1944 |

FOREIGN PATENTS

| Number | Country | Date |
| --- | --- | --- |
| 161,870 | Switzerland | May 31, 1933 |
| 483,677 | France | May 5, 1917 |

OTHER REFERENCES

American Machinist, Oct. 22, 1931, page 620.